(12) United States Patent
Aparin et al.

(10) Patent No.: US 7,711,329 B2
(45) Date of Patent: May 4, 2010

(54) ADAPTIVE FILTER FOR TRANSMIT LEAKAGE SIGNAL REJECTION

(75) Inventors: Vladimir Aparin, San Diego, CA (US); Gary John Ballantyne, Christchurch (NZ); Charles J. Persico, Rancho Santa Fe, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 980 days.

(21) Appl. No.: 10/792,171

(22) Filed: Mar. 2, 2004

(65) Prior Publication Data

US 2005/0107051 A1 May 19, 2005

Related U.S. Application Data

(60) Provisional application No. 60/519,561, filed on Nov. 12, 2003.

(51) Int. Cl.
H04B 1/44 (2006.01)
(52) U.S. Cl. .......................... 455/83; 455/24; 455/556.1
(58) Field of Classification Search ................ 455/83, 455/115.1, 295, 296, 310, 311, 556.1, 26, 455/63.1, 278.1, 24
See application file for complete search history.

(56) References Cited

U.S. PATENT DOCUMENTS

| | | | | |
|---|---|---|---|---|
| 4,825,459 A | * | 4/1989 | Farrow et al. ................... | 379/3 |
| 5,444,864 A | * | 8/1995 | Smith ........................... | 455/84 |
| 5,526,377 A | * | 6/1996 | Uedid et al. ................. | 375/229 |
| 5,995,567 A | | 11/1999 | Cioffi et al. ................. | 375/346 |
| 6,640,111 B1 | * | 10/2003 | Shapira ........................ | 455/562 |
| 7,072,614 B1 | * | 7/2006 | Kasperkovitz ................ | 455/24 |
| 2002/0072344 A1 | * | 6/2002 | Souissi ......................... | 455/296 |
| 2004/0219884 A1 | * | 11/2004 | Mo et al. ..................... | 455/67.11 |

FOREIGN PATENT DOCUMENTS

KR 2001-047138 6/2001
WO 0154290 7/2001

OTHER PUBLICATIONS

International Search Report—PCT/US04/038343, International Search Authority European Patent Office, Mar. 4, 2005.
Written Opinion PCT/US2004/038343, International Search Authority European Patent Office May 15, 2007.
International Preliminary Report on Patentability—PCT/US04/038343—IPEA/US—Feb. 9, 2009.

* cited by examiner

Primary Examiner—Nay A Maung
Assistant Examiner—Tuan H Nguyen
(74) Attorney, Agent, or Firm—Timothy F. Loomis; Ramin Mobarhan (57) ABSTRACT

An adaptive filter suitable for fabrication on an RF integrated circuit and used for transmit (TX) leakage rejection in a wireless full-duplex communication system is described. The adaptive filter includes a summer and an adaptive estimator. The summer receives an input signal having a TX leakage signal and an estimator signal having an estimate of the TX leakage signal, subtracts the estimator signal from the input signal, and provides an output signal having the TX leakage signal attenuated. The adaptive estimator receives the output signal and a reference signal having a version of the transmit signal, estimates the TX leakage signal in the input signal based on the output signal and the reference signal, and provides the estimator signal. The adaptive estimator may utilize an LMS algorithm to minimize a mean square error between the TX leakage signal in the input signal and the TX leakage signal estimate in the estimator signal.

28 Claims, 10 Drawing Sheets

ADAPTIVE FILTER FOR TRANSMIT LEAKAGE SIGNAL REJECTION

This application claims the benefit of provisional U.S. Application Ser. No. 60/519,561, entitled "Adaptive Filtering of TX Leakage in CDMA Receivers," filed Nov. 12, 2003.

BACKGROUND

I. Field

The present invention relates generally to electronics, and more specifically to techniques for mitigating the deleterious effects of a transmit (TX) leakage signal in a wireless full-duplex communication system.

II. Background

A wireless device in a wireless full-duplex communication system can simultaneously transmit and receive data for two-way communication. One such full-duplex system is a Code Division Multiple Access (CDMA) system. On the transmit path, a transmitter within the wireless device (1) modulates data onto a radio frequency (RF) carrier signal to generate an RF modulated signal and (2) amplifies the RF modulated signal to obtain a transmit signal having the proper signal level. The transmit signal is routed via a duplexer and transmitted from an antenna to one or more base stations. On the receive path, a receiver within the wireless device (1) obtains a received signal via the antenna and duplexer and (2) amplifies, filters, and frequency downconverts the received signal to obtain baseband signals, which are further processed to recover data transmitted by the base station(s).

For a full-duplex wireless device, the RF circuitry in the receiver is often subjected to interference from the transmitter. For example, a portion of the transmit signal typically leaks from the duplexer to the receiver, and the leaked signal (which is commonly referred to as a "TX leakage" signal or a "TX feed-through" signal) may cause interference to a desired signal within the received signal. Since the transmit signal and the desired signal typically reside in two different frequency bands, the TX leakage signal can normally be filtered out and does not pose a problem in itself. However, the TX leakage signal may interact with a "jammer" (which is a large amplitude undesired signal close in frequency to the desired signal) to generate "cross modulation" distortion components on both sides of the jammer, as described below. Distortion components that fall within the signal band of the desired signal and which are not filtered out act as additional noise that may degrade performance.

A surface acoustic wave (SAW) filter is often used to filter out the TX leakage signal and mitigate its deleterious effects. The use of a SAW filter for TX leakage rejection is undesirable for several reasons. First, the SAW filter is normally a discrete component that is not fabricated on an RF integrated circuit (RFIC) and thus occupies space on a circuit board. Second, the SAW filter typically requires other discrete components for input and output impedance matching. Third, the SAW filter and its impedance matching circuitry increase the cost of the wireless device.

There is therefore a need in the art for techniques to mitigate the deleterious effects of a TX leakage signal without using a SAW filter.

SUMMARY

Adaptive filters that can attenuate a TX leakage signal in wireless full-duplex communication systems (e.g., a CDMA system) are described herein. An adaptive filter may be fabricated on an RFIC, along with other circuit blocks for a receiver such as a low noise amplifier (LNA) for amplification, a mixer for frequency downconversion, and so on. The adaptive filters can avoid the disadvantages described above for SAW filters.

In an embodiment, an adaptive filter suitable for use for TX leakage rejection includes a summer and an adaptive estimator. The summer receives an input signal having TX leakage signal and an estimator signal having an estimate of the TX leakage signal, subtracts the estimator signal from the input signal, and provides an output signal having the TX leakage signal attenuated. The adaptive estimator receives the output signal and a reference signal having a portion or version of the signal being transmitted, estimates the TX leakage signal in the input signal based on the output signal and the reference signal, and provides the estimator signal having the TX leakage signal estimate.

The adaptive estimator may utilize a least mean squared (LMS) algorithm to minimize a mean square error (MSE) between the TX leakage signal in the input signal and the TX leakage signal estimate in the estimator signal. In this case, the adaptive estimator may include (1) a first multiplier that multiplies the output signal with an in-phase reference signal and provides a first in-phase signal, (2) a first integrator that integrates the first in-phase signal and provides a second in-phase signal, (3) a second multiplier that multiplies the second in-phase signal with either the in-phase reference signal or a quadrature reference signal and provides a third in-phase signal, (4) a third multiplier that multiplies the output signal with the quadrature reference signal and provides a first quadrature signal, (5) a second integrator that integrates the first quadrature signal and provides a second quadrature signal, and (6) a fourth multiplier that multiplies the second quadrature signal with either the in-phase or quadrature reference signal and provides a third quadrature signal, and (7) a summer that sums the third in-phase signal and the third quadrature signal and provides the estimator signal. The multipliers may be implemented with mixers. The adaptive estimator may further include other circuit blocks/elements for improved performance, as described below. A quadrature splitter receives the reference signal and provides the in-phase and quadrature reference signals for the adaptive estimator.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The adaptive filters described herein may be used for various wireless full-duplex communication systems. These adaptive filters may also be used for various frequency bands such as a cellular band from 824 to 894 MHz, a Personal Communication System (PCS) band from 1850 to 1990 MHz, a Digital Cellular System (DCS) band from 1710 to 1880 MHz, an International Mobile Telecommunications-2000 (IMT-2000) band from 1920 to 2170 MHz, and so on. For clarity, the following description is for the cellular band, which includes (1) an uplink frequency band from 824 to 849 MHz and (2) a downlink frequency band from 869 to 894 MHz. The uplink and downlink frequency bands are transmit (TX) and receive (RX) frequency bands, respectively, for a wireless device.

Figure 1:
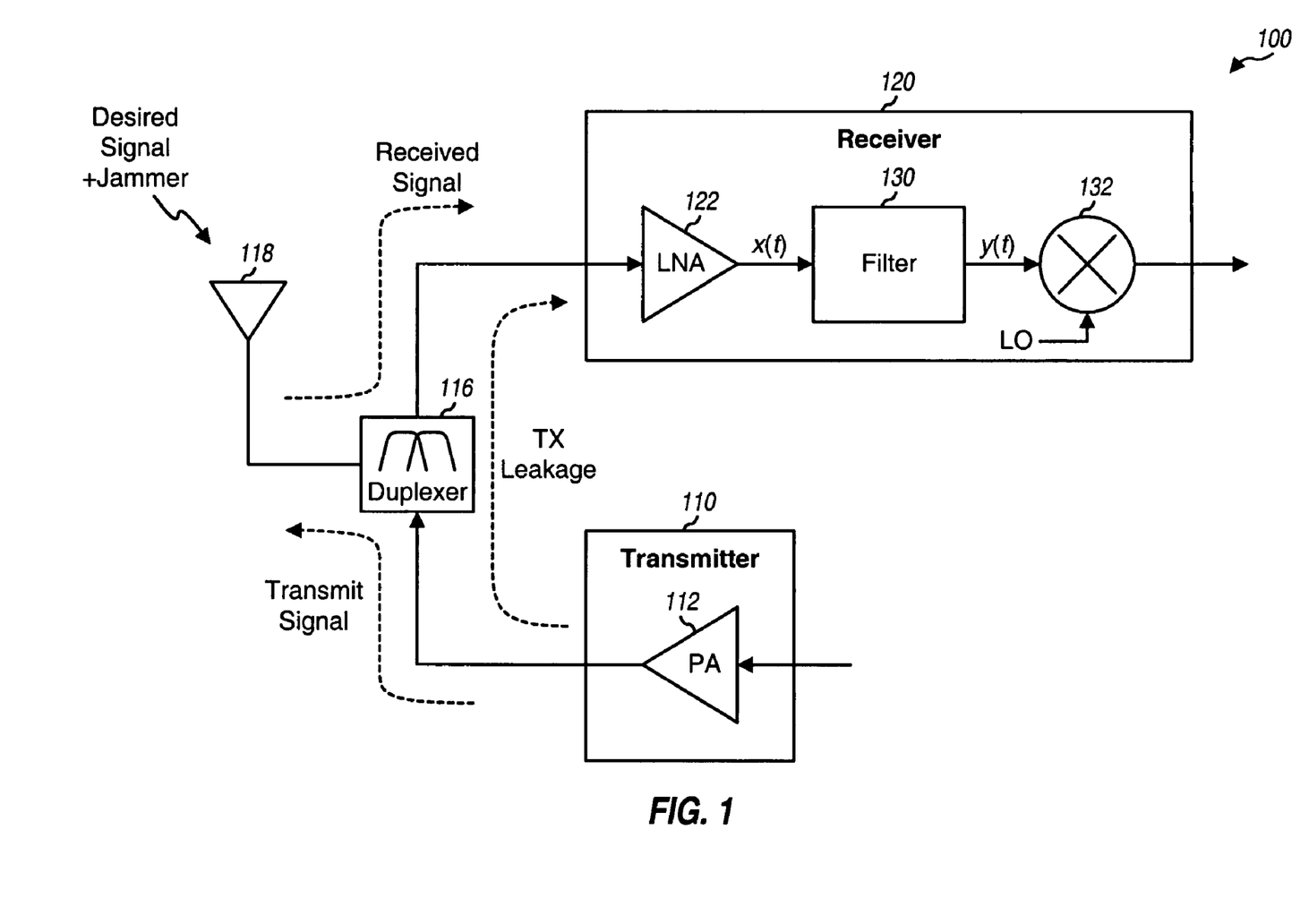
FIG. 1 shows an RF portion of a wireless device.

FIG. 1 shows a block diagram of an RF portion of a wireless device 100. On the transmit path, a power amplifier (PA) 112 within a transmitter 110 receives and amplifies a TX modulated signal and provides a transmit signal. The transmit signal is routed through a duplexer 116 and transmitted via an antenna 118 to one or more base stations. A portion of the transmit signal also couples or leaks through duplexer 116 to the receive path. The amount of TX leakage is dependent on the isolation between the transmit and receive ports of the duplexer, which may be approximately 50 dB for a SAW duplexer at the cellular band. A lower TX-RX isolation results in higher level of TX leakage.

On the receive path, a received signal containing a desired signal and possibly a jammer is received via antenna 118, routed through duplexer 116, and provided to an LNA 122 within a receiver 120. LNA 122 also receives a TX leakage signal from the transmit path, amplifies the receiver input signal at its input, and provides an amplified RF signal, x(t). A filter 130 receives and filters the amplified RF signal to remove out of band signal components (e.g., the TX leakage signal) and provides a filtered RF signal, y(t). A mixer 132 receives and frequency downconverts the filtered RF signal with a local oscillator (LO) signal and provides a downconverted signal.

Figure 2A:
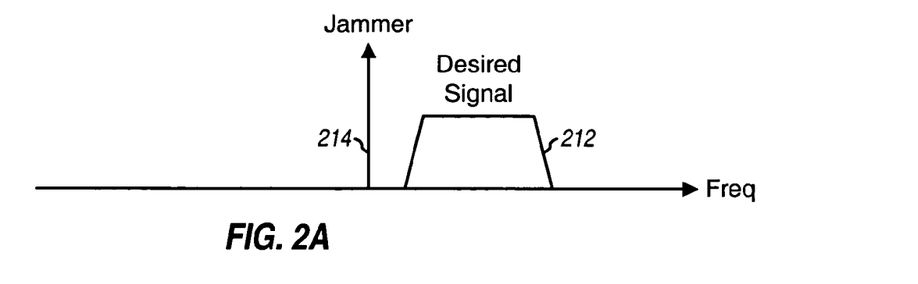
FIGS. 2A through 2C show signals at various points in a receiver within the wireless device.

FIG. 2A shows the received signal, which includes a desired signal 212 and a jammer 214. Jammer 214 is an undesired signal and may correspond to, for example, a signal transmitted by a nearby base station in an Advanced Mobile Phone Service (AMPS) system. The jammer may have an amplitude that is much higher than that of the desired signal and may be located close in frequency to the desired signal.

Figure 2B:
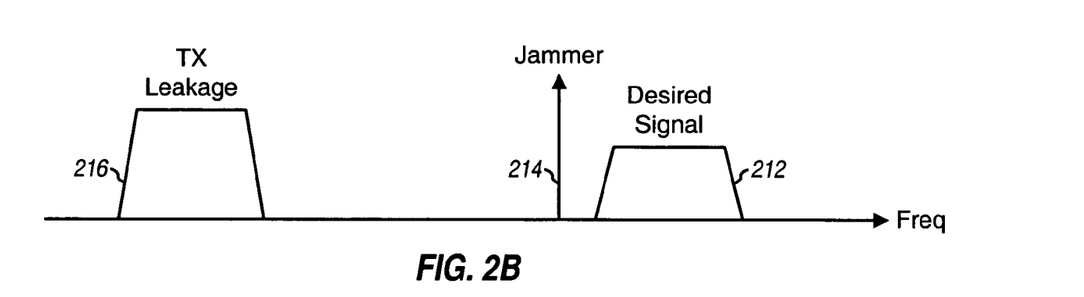

FIG. 2B shows the signal at the input of LNA 122. This signal contains desired signal 212 and jammer 214 in the received signal as well as a TX leakage signal 216 from the transmit path. The TX leakage signal may have a large amplitude relative to the desired signal because the transmit signal is often much larger in amplitude than the desired signal.

Figure 2C:
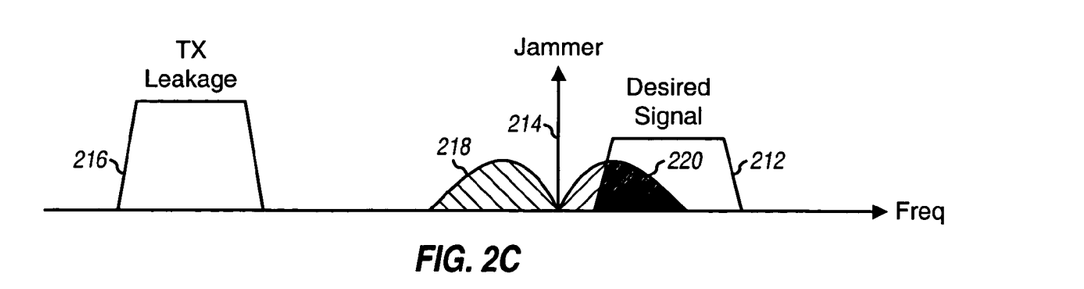

FIG. 2C shows the signal at the output of mixer 132. Non-linearity in LNA 122 and mixer 132 can cause the modulation on TX leakage signal 216 to be transferred to (narrowband) jammer 214, which then results in a widened spectrum 218 around the jammer. This spectral widening is referred to as cross modulation and is described in detail below. As shown in FIG. 2C, a portion 220 of widened spectrum 218 (which is shown with shading) may fall within the desired signal band. Portion 220 acts as additional noise that degrades the performance of the wireless device. This noise further degrades the receiver sensitivity so that the smallest desired signal that can be reliably detected by the receiver needs to have a larger amplitude.

Figure 3:
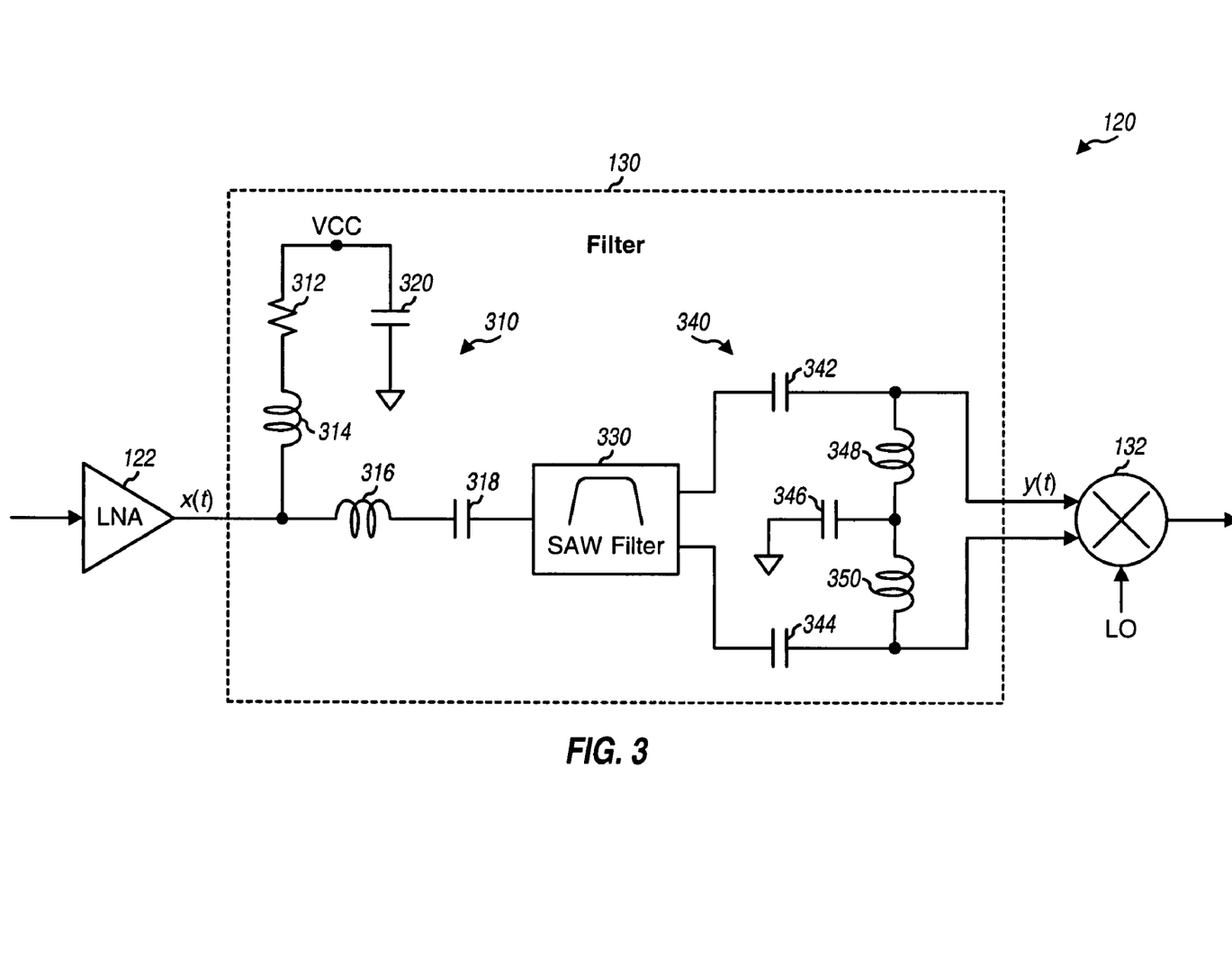
FIG. 3 shows an implementation of the receiver with an RF SAW filter.

FIG. 3 shows a schematic diagram of a conventional implementation of receiver 120 with an RF SAW filter 330. SAW filter 330 has various desirable characteristics such as sharp transition band edges and large attenuation of out-of-band signal components. SAW filter 330 is often used to reject the TX leakage signal at the input of mixer 132, which then reduces the amount of cross modulation distortion generated by the mixer.

LNA 122 couples to SAW filter 330 via an input impedance matching network 310 formed by a resistor 312, inductors 314 and 316, and a capacitor 318. SAW filter 330 couples to mixer 132 via an output impedance matching network 340 formed by capacitors 342, 344, and 346 and inductors 348 and 350. A capacitor 320 provides filtering of the power supply, VCC, for LNA 122.

The use of an RF SAW filter for TX leakage signal filtering has several disadvantages. First, if LNA 122 and mixer 132 are implemented within a single RFIC for reduced cost and improved reliability, then SAW filter 330 is implemented off-chip and requires three IC package pins for interface to the LNA and mixer. Second, SAW filter 330 and the discrete components for matching networks 310 and 340 require extra board space and further add cost to the wireless device. Third, the insertion losses of SAW filter 330 and matching networks 310 and 340 degrade the cascaded gain and noise figure of the receiver.

An adaptive filter may be used to reject the TX leakage signal and avoid the disadvantages described above for the SAW filter. The adaptive filter may be implemented on an RFIC (e.g., the same RFIC used for the LNA and mixer) so that no additional board space is needed for external components and cost is reduced. The adaptive filter may be designed to achieve the desired rejection of the TX leakage signal and consume low power.

Figure 4:
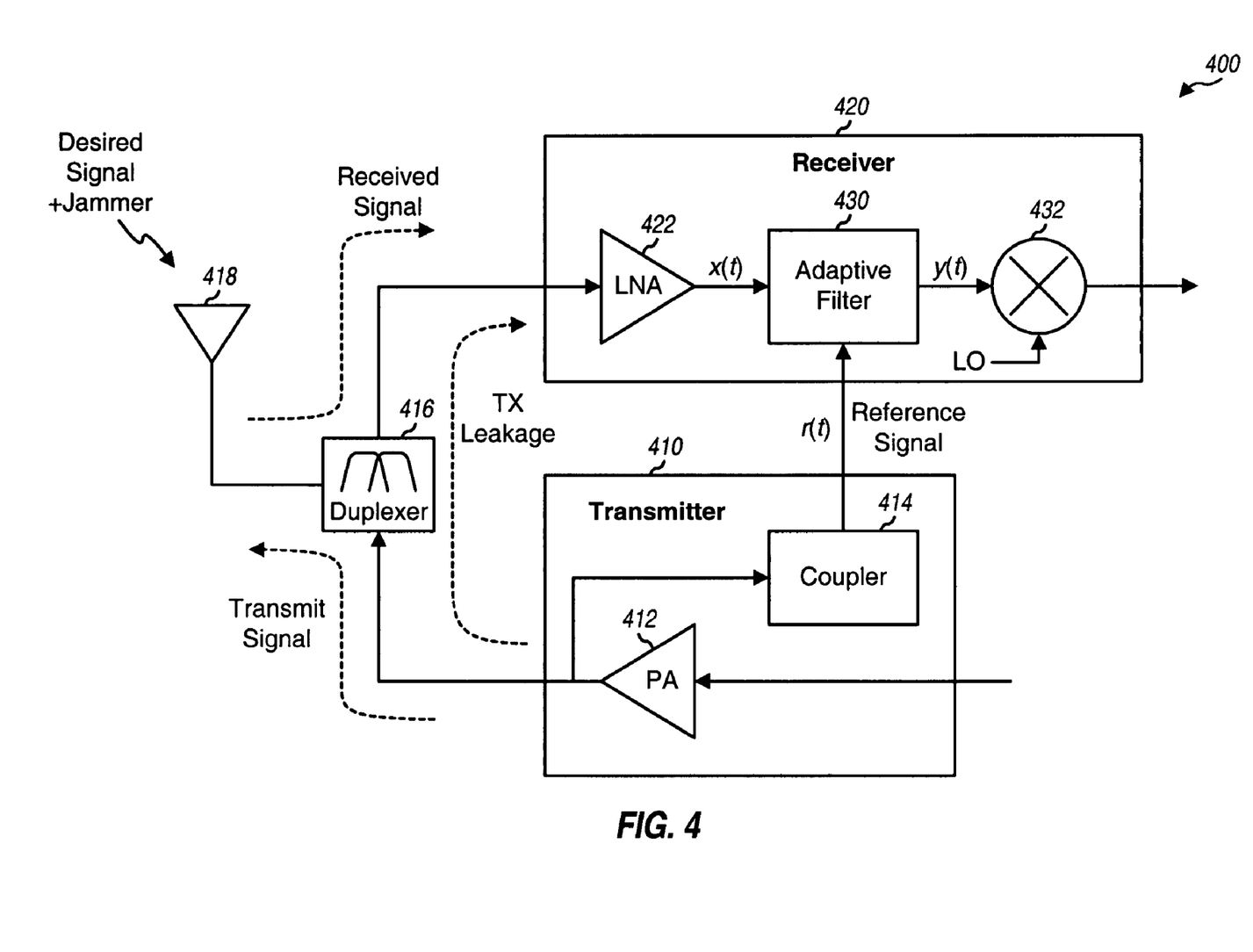
FIG. 4 shows the RF portion of a wireless device with an adaptive filter for TX leakage rejection.

FIG. 4 shows a block diagram of the RF portion of a wireless device 400 with an adaptive filter 430 for TX leakage rejection. On the transmit path, a TX modulated signal is amplified by a power amplifier 412 within a transmitter 410, routed through a duplexer 416, and transmitted via an antenna 418 to one or more base stations. A coupler 414 receives the transmit signal from power amplifier 412 and provides a portion of this transmit signal as a reference signal, r(t).

On the receive path, a received signal is received via antenna 418, routed through duplexer 416, and provided to an LNA 422 within a receiver 420. LNA 422 also receives the TX leakage signal from the transmit path, amplifies the signal at its input, and provides an amplified RF signal, x(t). Adaptive filter 430 receives and filters the amplified RF signal to attenuate/reject the TX leakage signal and provides a filtered RF signal, y(t). A mixer 432 frequency downconverts the filtered RF signal with an LO signal and provides a downconverted signal.

In general, adaptive filter 430 may be located at any point on the received path prior to mixer 432. For example, adaptive filter 430 may be placed either before or after LNA 422. Improved noise performance can typically be achieved with adaptive filter 430 placed after LNA 422.

Figure 5:
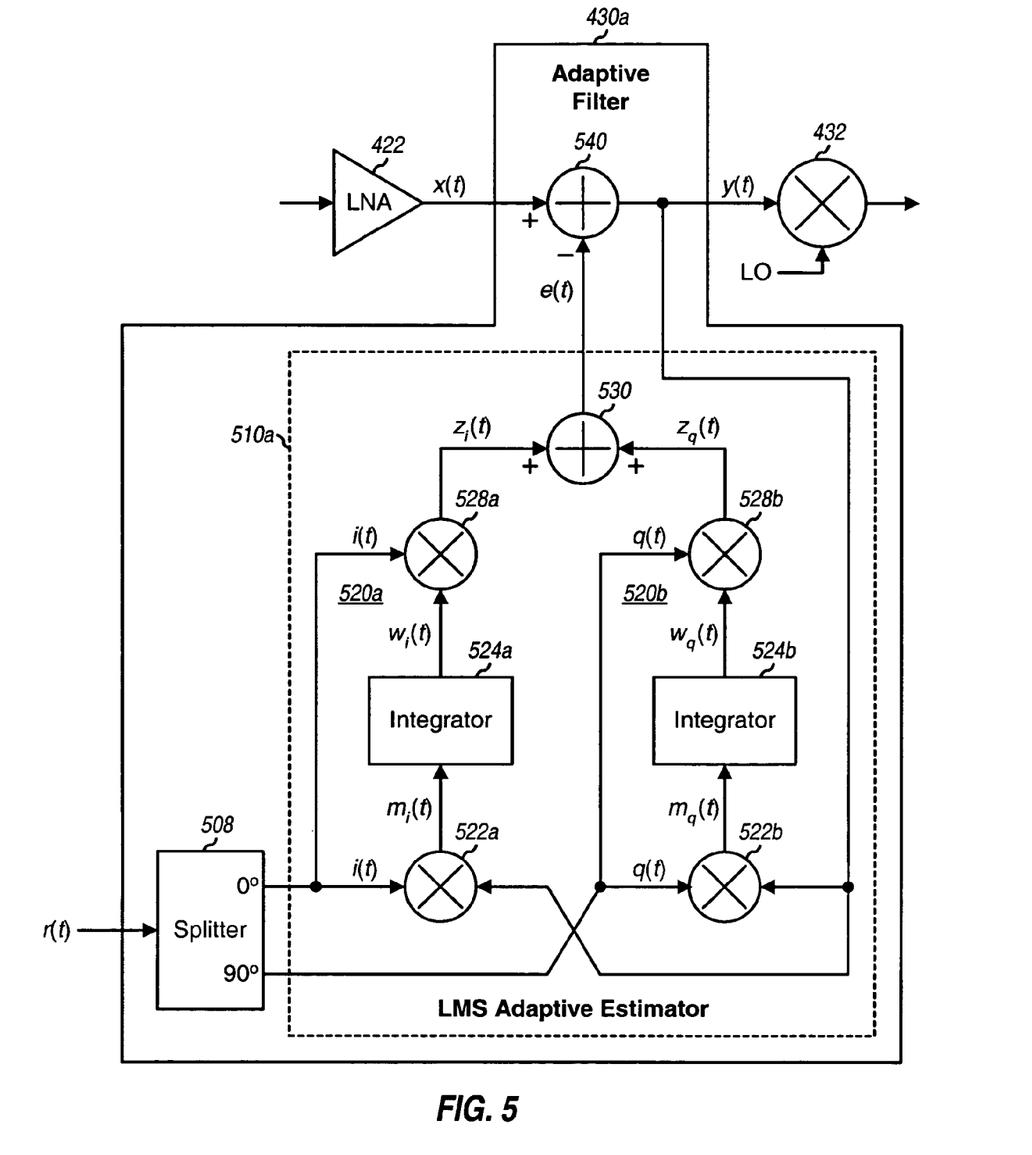
FIGS. 5 and 6 show two embodiments of the adaptive filter.

FIG. 5 shows a block diagram of an adaptive filter 430a, which is an embodiment of adaptive filter 430 within receiver 420. Adaptive filter 430a generates an estimate of the TX leakage signal, e(t), based on the r(t) reference signal and further subtracts the TX leakage signal estimate from the x(t) signal to obtain the y(t) signal for mixer 432. The x(t) signal is also referred to as the filter input signal, and the y(t) signal is also referred to as the filter output signal.

For the embodiment shown in FIG. 5, adaptive filter 430a utilizes an LMS algorithm to minimize the mean square error between the TX leakage signal in the filter input signal and the TX leakage signal estimate. Adaptive filter 430a includes a quadrature splitter 508, an LMS adaptive estimator 510a, and a summer 540. Quadrature splitter 508 receives the reference signal, r(t), and provides an in-phase reference signal, i(t), and a quadrature reference signal, q(t). The i(t) and q(t) signals respectively contain the in-phase and quadrature components of the reference signal, with the i(t) signal leading the q(t) signal by 90°.

LMS estimator 510a includes an in-phase section 520a, a quadrature section 520b, and a summer 530. Within in-phase section 520a, a multiplier 522a receives and multiplies the i(t) signal with the y(t) signal and provides an $m_i(t)$ signal, which is $m_i(t)=y(t) \cdot i(t)$. An integrator 524a receives and integrates the $m_i(t)$ signal and provides an in-phase integrated signal, $w_i(t)$. A multiplier 528a receives and multiplies the i(t) signal with the $w_i(t)$ signal and provides a $z_i(t)$ signal, which is $z_i(t)=w_i(t) \cdot i(t)$. Similarly, within quadrature section 520b, a multiplier 522b receives and multiplies the q(t) signal with the y(t) signal and provides an $m_q(t)$ signal, which is $m_q(t)=y(t) \cdot q(t)$. An integrator 524b receives and integrates the $m_q(t)$ signal and provides a quadrature integrated signal, $w_q(t)$. A multiplier 528b receives and multiplies the q(t) signal with the $w_q(t)$ signal and provides a $z_q(t)$ signal, which is $z_q(t)=w_q(t) \cdot q(t)$. Multipliers 522a, 522b, 528a, and 528b are four-quadrant multipliers. Summer 530 receives and sums the $z_i(t)$ and $z_q(t)$ signals and provides an estimator signal, e(t), which contains the TX leakage signal estimate obtained based on the LMS algorithm. The $w_i(t)$ and $w_q(t)$ signals are effectively weights used for estimating the TX leakage signal.

Summer 540 receives the estimator signal, e(t), from LMS estimator 510a and the filter input signal, x(t), which contains the received signal as well as the TX leakage signal. Summer 540 subtracts the estimator signal from the filter input signal and provides the filter output signal, y(t).

For the LMS algorithm, the estimator signal from LMS estimator 510a may be expressed as:

$$e(t) = \mu \cdot \left[ i(t) \cdot \int_{\tau=0}^{t} i(\tau) \cdot y(\tau) d\tau + q(t) \cdot \int_{\tau=0}^{t} q(\tau) \cdot y(\tau) d\tau \right], \quad \text{Eq (1)}$$

where $\mu$ is the unity-gain angular frequency of LMS estimator 510a, which is the angular frequency at which the overall gain from the output of summer 540 to the inverting input of summer 540 is equal to one. The parameter $\mu$ includes the gains of all circuit blocks in the feedback loop from the output to the inverting input of summer 540 and is given in units of rad/sec/V². Equation (1) assumes that the integrators are ideal with a single pole at DC.

The filter output signal from adaptive 430a may be expressed as:

$$y(t) = x(t) - e(t) = \quad \text{Eq (2)}$$

$$x(t) - \mu \cdot \left[ i(t) \cdot \int_{\tau=0}^{t} i(\tau) \cdot y(\tau) d\tau + q(t) \cdot \int_{\tau=0}^{t} q(\tau) \cdot y(\tau) d\tau \right].$$

The filter output signal, y(t), is often referred to as an error signal. For simplicity, the following analysis assumes that the x(t) signal contains only the TX leakage signal. The TX leakage signal and the in-phase and quadrature reference signals may also be assumed to be sinusoids with the following form:

$$x(t)=A \cdot \sin(\omega t+\phi), i(t)=B \cdot \sin(\omega t), \text{ and } q(t)=B \cdot \cos(\omega t), \quad \text{Eq (3)}$$

where A is the amplitude of the TX leakage signal;
$\phi$ is a random angle of the TX leakage signal;
B is the amplitude of the r(t) reference signal; and
$\omega$ is the angular frequency of the transmit signal and the reference signal.

A frequency f and its angular frequency $\omega$ are related by a factor of $2\pi$, or $\omega=2\pi \cdot f$. Equation (2) may be converted to a linear second-order ordinary differential equation with the signals shown in equation (3), as follows:

$$\frac{d^2 y(t)}{dt^2} = \mu \cdot B^2 \frac{dy(t)}{dt} + \omega^2 \cdot y(t) = 0. \quad \text{Eq (4)}$$

Equation (4) may be solved using Laplace transform, as follows:

$$s^2 \cdot Y(s) - s \cdot y(0) - y'(0) + \mu \cdot B^2 [s \cdot Y(s) - y(0)] + \omega^2 \cdot Y(s) = 0, \quad \text{Eq (5)}$$

where y(0) and y'(0) are initial conditions for y(t) and d y(t)/dt, respectively. If no reference signal is applied for $t \leq 0$ (i.e., i(t)=0 and q(t)=0 for $t \leq 0$), then y(t)=x(t) for $t \leq 0$, and the initial conditions may be expressed as:

$$y(0)=x(0)=A \cdot \sin(\phi), \text{ and}$$

$$y'(0)=x'(0)=A \cdot \omega \cdot \cos(\phi). \quad \text{Eq (6)}$$

With the initial conditions as shown in equation (6), the Laplace transform of the adaptive filter output, y(t), may be expressed as:

$$Y(s) = A \cdot \frac{s \cdot \sin(\phi) + \omega \cdot \cos(\phi) + 2\zeta\omega \cdot \sin(\phi)}{s^2 + 2\zeta\omega \cdot s + \omega^2}, \quad \text{Eq (7)}$$

where $\zeta$ is a damping factor, which is $\zeta=\mu \cdot B^2/(2\omega)$. The Laplace transform of the adaptive filter input, x(t), may be expressed as:

$$X(s) = A \cdot \frac{s \cdot \sin(\phi) + \omega \cdot \cos(\phi)}{s^2 + \omega^2}. \quad \text{Eq (8)}$$

The transfer function of adaptive 430a may then be expressed as:

$$H(s) = \quad \text{Eq (9)}$$

$$\frac{Y(s)}{X(s)} = \frac{s \cdot \sin(\phi) + \omega \cdot \cos(\phi) + 2\zeta\omega \cdot \sin(\phi)}{s \cdot \sin(\phi) + \omega \cdot \cos(\phi)} \cdot \frac{s^2 + \omega^2}{s^2 + 2\zeta\omega \cdot s + \omega^2},$$

where $s=j\omega_x$ and $\omega_x$ is a variable for angular frequency.

Figure 10:
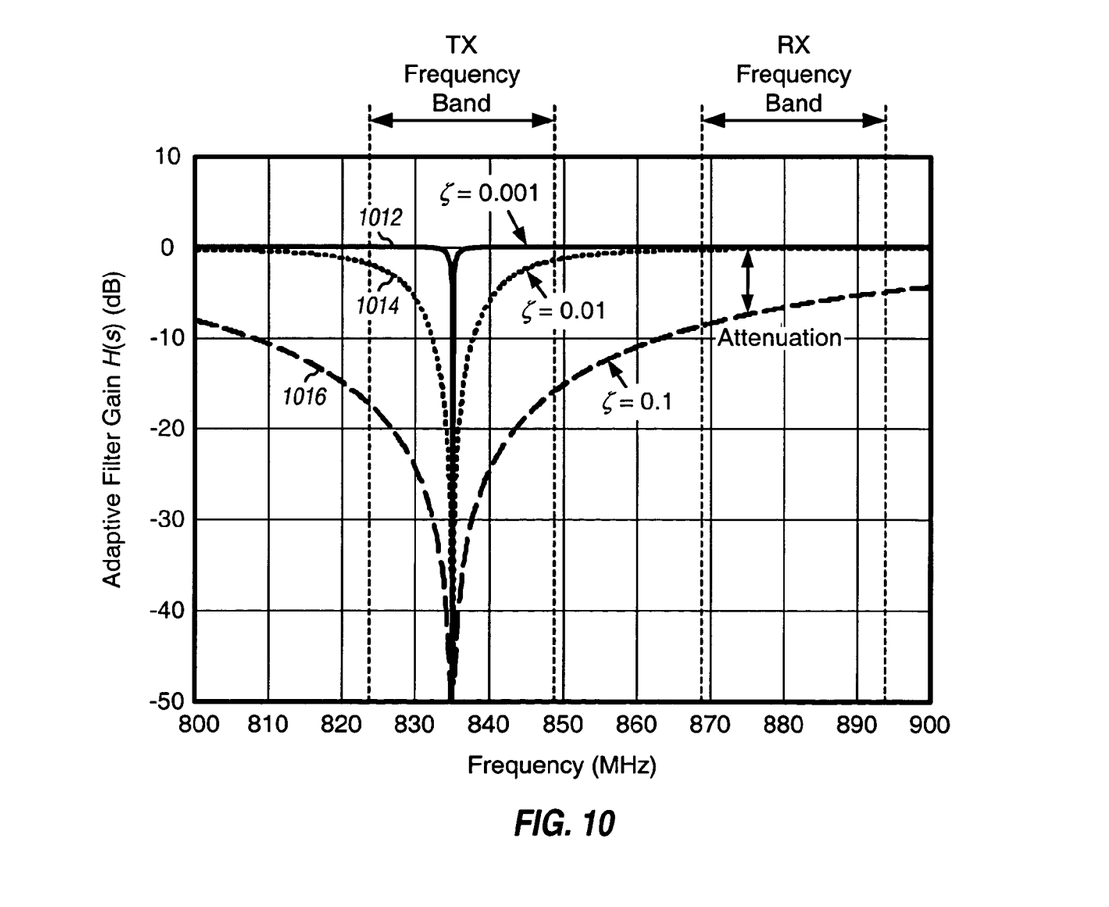
FIG. 10 shows the frequency responses of the adaptive filter for three different damping factors.

FIG. 10 shows the frequency responses of adaptive 430a for three different damping factors. The frequency responses are given for a TX leakage signal composed of a single tone at frequency of $\omega/2\pi=835$ MHz. Plot 1012 in FIG. 10 shows the frequency response for a damping factor of $\zeta=0.001$ (underdamping), which has the narrowest notch and the least amount of attenuation in the RX frequency band of 869 to 894 MHz for the cellular band. Plots 1014 and 1016 in FIG. 10 show the frequency responses for damping factors of $\zeta=0.01$ and $\zeta=0.1$, respectively. As the damping factor increases, the notch widens and the amount of attenuation in the RX frequency band increases. An ideal adaptive filter can achieve infinite attenuation of the TX leakage signal. The amount of TX leakage attenuation achieved by a practical adaptive filter is dependent on imperfections in the adaptive filter, as described below.

The inverse Laplace transform of Y(s) in equation (7) may be expressed as:

$$y(t) = A \cdot e^{-\zeta \omega t} \cdot \left[ \frac{\cos(\phi) + \zeta \cdot \sin(\phi)}{\sqrt{1-\zeta^2}} \cdot \sin\left(\omega t \sqrt{1-\zeta^2}\right) + \sin(\phi) \cdot \cos\left(\omega t \sqrt{1-\zeta^2}\right) \right]. \quad \text{Eq (10)}$$

The exponential term $e^{-\zeta \omega t}$ controls the settling time and thus the convergence speed of the LMS algorithm. Since the damping factor $\zeta$ needs to be much smaller than one (i.e., $\zeta \ll 1$) to reduce filter distortion and attenuation, as shown in FIG. 10, equation (10) may be simplified as follows:

$$y(t) \approx x(t) \cdot e^{-\zeta \omega t}. \quad \text{Eq (11)}$$

Equation (11) indicates that the filter output signal is simply an exponentially decaying version of the filter input signal. For 30 dBc of TX leakage rejection, $e^{-\zeta \omega t} = 10^{-30/20}$, and the settling time may be expressed as:

$$t_{settle,30dBc} = \frac{1.5}{\log(e) \cdot \zeta \omega}. \quad \text{Eq (12)}$$

Adaptive 430a generates cross modulation distortion even if all of the circuit blocks of the adaptive filter are perfectly linear. The cross modulation distortion is generated by the frequency mixing function of multipliers 522 and 528, as illustrated in FIGS. 11A through 11D.

Figure 11A:
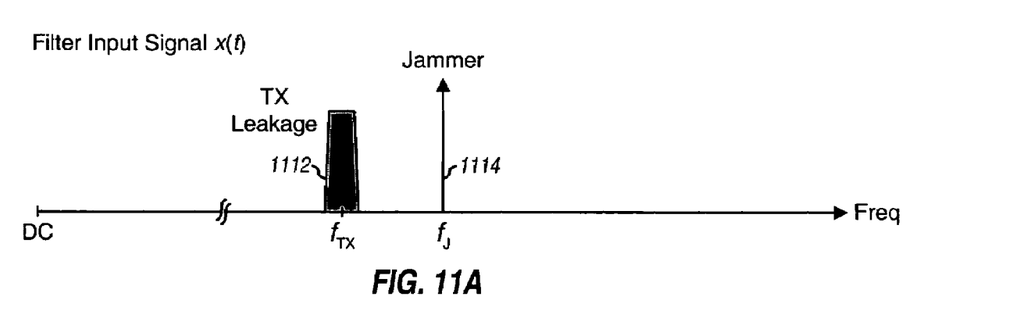
FIGS. 11A through 11D show the generation of cross modulation distortion due to double mixing within the adaptive filter.

FIG. 11A shows a case in which the filter input signal, x(t), contains TX leakage signal 1112 centered at frequency $f_{TX}$ and a single-tone jammer 1114 located at frequency $f_J$. For this example, the jammer frequency is close to the signal band of the desired signal and $f_J - f_{TX} \approx 45$ MHz, which is the separation between the TX and RX frequency bands for the cellular band.

Figure 11B:
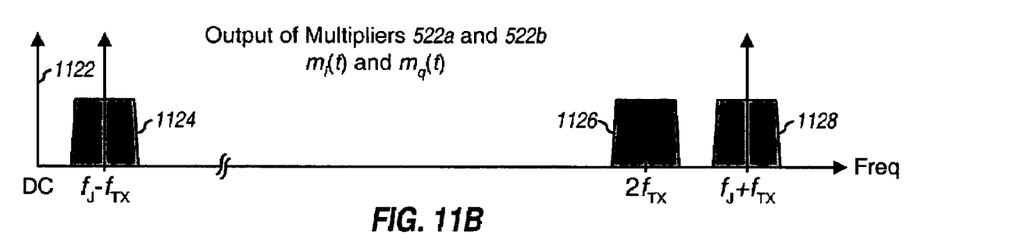

FIG. 11B shows the signal components at the output of each of multipliers 522a and 522b. Signal component 1122 at DC and signal component 1126 at $2f_{TX}$ are generated by the mixing between the TX leakage signal and the i(t) and q(t) reference signals. Signal component 1124 at $f_J - f_{TX}$ and signal component 1128 at $f_J + f_{TX}$ are generated by the mixing between the jammer and the reference signals.

Figure 11C:
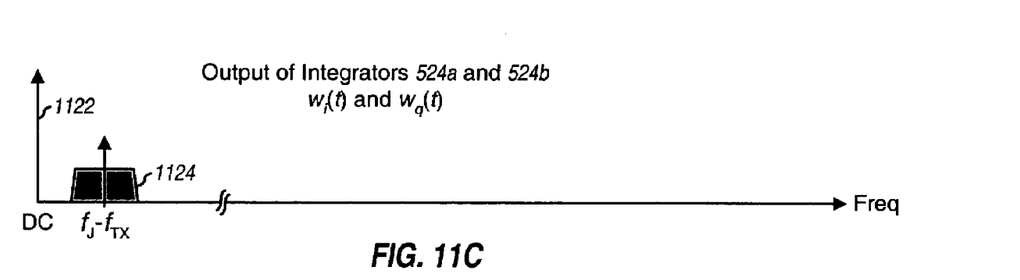

FIG. 11C shows the signal components at the output of each of integrators 524a and 524b. For this analysis, each integrator 524 has an ideal transfer function, which is a single pole at DC. Signal component 1124 at $f_J - f_{TX}$ is attenuated by a particular amount, and signal components 1126 and 1128 at the higher frequencies are attenuated by larger amounts and are negligible. Signal component 1124 represents an undesired component that contains the convolved spectra of the jammer and the transmit signal.

Figure 11D:
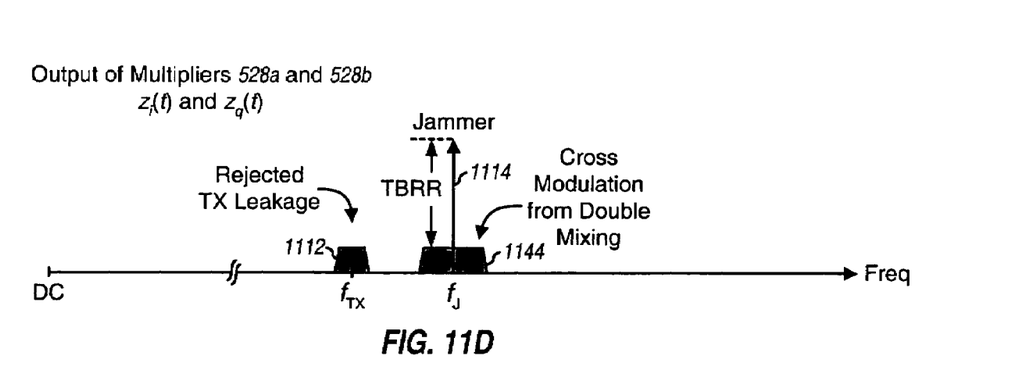

FIG. 11D shows the signal components at the output of adaptive filter 430a. Signal component 1144 centered at $f_J$ is generated by the mixing of signal component 1124 centered at $f_J - f_{TX}$ and the reference signals centered at $f_{TX}$. The double mixing actions of multipliers 522a/522b and multipliers 528a/528b result in the transmit signal component centered at $f_{TX}$ being transferred to the jammer frequency $f_J$. Signal component 1144 represents the cross modulation distortion that is added to the filter input signal by summer 540. The filter output signal contains an attenuated/rejected TX leakage signal 1112, an unattenuated jammer 1114, and signal component 1144.

The cross modulation distortion generated by adaptive 430a may be analyzed by a triple beat distortion. For the analysis, the transmit signal (and thus the reference signal) contains two closely spaced tones at frequencies of $f_{TX} \pm \Delta f/2$. The filter input signal contains (1) the TX leakage signal with the two transmit tones and (2) an inband single-tone jammer at a frequency of $f_J$. If the adaptive filter completely rejects the TX leakage signal such that the filter output signal, y(t), contains only the jammer, then its triple beat distortion, d(t), may be derived as:

$$d(t) = \frac{\mu}{\omega_J - \omega_{TX}} [i^2(t) \cdot y(t) + q^2(t) \cdot y(t)]_{\omega = \omega_j \pm \Delta \omega}, \quad \text{Eq (13)}$$

where $i(t) = B \cdot [\sin((\omega - \Delta\omega/2) \cdot t) + \sin((\omega + \Delta\omega/2) \cdot t)]$;

$q(t) = B \cdot [\cos((\omega - \Delta\omega/2) \cdot t) + \cos((\omega + \Delta\omega/2) \cdot t)]$; and $y(t) = C \cdot \cos(\omega_J t)$, where C is the amplitude of the jammer.

Equation (13) indicates that two triple beat distortion terms are generated at frequencies of $f_J \pm \Delta f$, as described above for FIGS. 11A through 11D.

A triple beat rejection ratio (TBRR) is defined as the ratio of the jammer amplitude to the amplitude of the cross modulation distortion. The TBRR may be obtained by performing simple trigonometric manipulations on equation (13) and taking the ratio of the jammer amplitude to the triple beat distortion amplitude. The TBRR may be expressed as:

$$TBRR = 10 \log\left(\frac{\omega_J - \omega_{TX}}{\mu \cdot B^2}\right) = 20 \log\left[\frac{1}{2\zeta}\left(\frac{\omega_J}{\omega_{TX}} - 1\right)\right], \quad \text{Eq (14)}$$

where $\zeta = \mu \cdot B^2 / (2\omega_{TX})$ is the damping factor. Equation (14) indicates that a TBRR of 68 dBc may be obtained with a damping factor of $\zeta \leq 8.1 \times 10^{-6}$ for $f_{TX} = 849$ MHz and $f_J = 894$ MHz. The settling time is 81 μsec with this damping factor.

Figure 6:
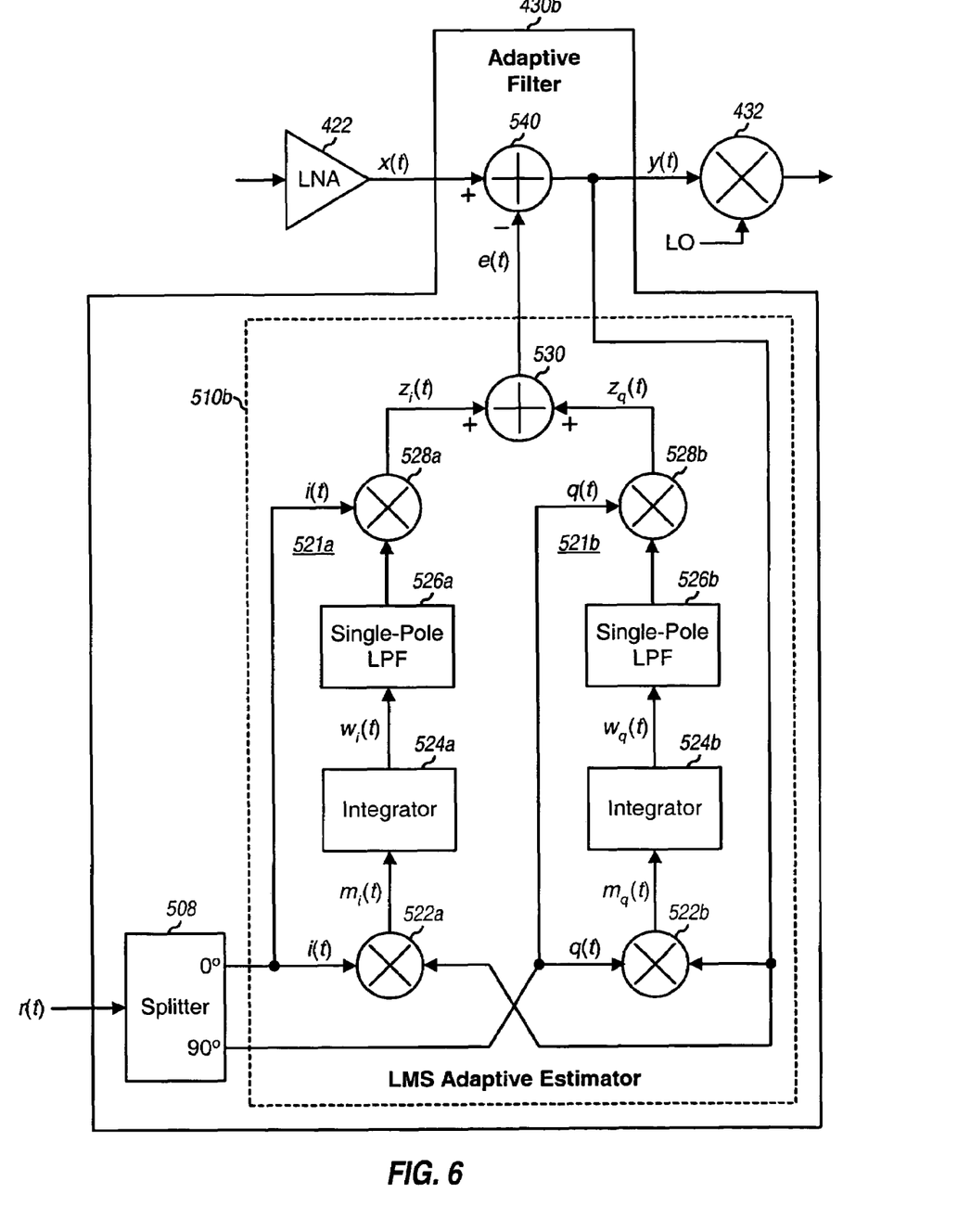

FIG. 6 shows a block diagram of an adaptive filter 430b, which is another embodiment of adaptive filter 430 within receiver 420. Adaptive filter 430b includes an additional pole used to (1) reduce the amplitude of the cross modulation distortion generated by the adaptive filter (2) achieve faster LMS algorithm convergence, and (3) shorten the settling time.

Adaptive filter 430b includes an LMS adaptive estimator 510b and summer 540. LMS estimator 510b includes all of the circuit blocks for LMS estimator 510a in FIG. 5. LMS estimator 510b further includes (1) a single-pole or first-order lowpass filter (LPF) 526a placed between the output of integrator 524a and the input of multiplier 528a and (2) a single-pole lowpass filter 526b placed between the output of integrator 524b and the input of multiplier 528b. Each lowpass filter 526 may be implemented, for example, with an RC lowpass network composed of a series resistor and a shunt capacitor to circuit ground. The frequency of the single pole is selected such that the adaptive filter is unconditionally stable. As an example, with the additional pole placed at 318 KHz, the damping factor may be increased to $\zeta = 1 \times 10^{-4}$, the settling time may be reduced to 6 μsec, and the TBRR may be improved to better than 80 dBc. All of these improvements are achieved with an unconditionally stable adaptive filter. Lowpass filters of higher order and/or with poles placed at different frequencies may also be used for lowpass filters 526a and 526b.

An ideal adaptive filter provides infinite rejection of the TX leakage signal so that the filter output signal contains no TX leakage signal. However, various imperfections in a practical/realizable adaptive filter limit the amount of TX leakage rejection that may be achieved. Such imperfections may include, for example, finite gain for the integrators and non-zero DC offsets for the circuit blocks of the LMS estimator.

A TX leakage rejection ratio (TXRR) is the ratio of the TX leakage signal power at the adaptive filter output to the TX leakage signal power at the adaptive filter input. The TXRR requirement for adaptive filter 430 is dependent on various factors such as, for example, (1) the maximum TX leakage signal power expected at the output of LNA 422 and (2) the maximum acceptable TX leakage signal power at the input of mixer 432. It can be shown that an adaptive filter with a TXRR of approximately 30 dB can provide performance comparable to that achieved by a receiver with an RF SAW filter (e.g., the receiver shown in FIG. 3). In general, the TXRR requirement for the adaptive filter is dependent on various factors, such as those noted above and possibly other factors.

Adaptive filters 430a and 430b have similar TXRR performance. The actual TXRR achieved by adaptive 430a is dependent on various factors such as, for example, (1) the overall gain of the integrators and multipliers and (2) the DC offsets of the multipliers and integrators. An inadequate overall gain limits the TXRR that can be achieved by the adaptive filter. The overall gain is thus selected such that the required TXRR can be achieved and is appropriately distributed among the integrator and multipliers.

DC offsets can also adversely affect the TXRR performance of adaptive filter 430a. Multipliers 522a, 522b, 528a, and 528b typically have DC responses due to imbalances on the two inputs. Integrator 524a and 524b have systematic as well as random input DC offsets. The DC offsets introduce an error that reduces the amount of TX leakage rejection by the filter. Also, due to their large DC gains, the integrators may be saturated initially by the combined DC offsets. Once saturated, the integrators have very low gains that result in a long settling time for the adaptive filter. To prevent saturation due to DC offsets, the output of each integrator may be reset (e.g., by shorting together the differential output of each integrator) prior to enabling the adaptive filter and then released thereafter.

Various techniques may be used to achieve low combined DC offsets for the in-phase and quadrature paths. The combined DC offsets may be reduced by:

Increasing the gain of multipliers 522a and 522b and reducing their DC offsets;

Increasing the reference signal power (i.e., increase B); and/or

Using dynamic offset cancellation techniques such as chopper stabilization and/or auto-zeroing techniques.

The multiplier gain may be increased by converting multipliers 522a and 522b into mixers and using the in-phase and quadrature reference signals as strong LO signals. The high gain of the mixers (e.g., approximately 50 dB for an exemplary mixer design) can significantly reduce the DC offset contribution of the integrators. The output DC offset of the mixers is low due to the inherent chopping action of the mixers.

Chopper stabilization techniques may be able to achieve low input DC offset voltages (e.g., below 10 μV). Auto-zeroing techniques, such as correlated double sampling techniques, typically increase the noise floor, which may then contaminate the RX frequency band. The auto-zeroing techniques should thus be used with care.

Adaptive filter 430 inherently introduces additional noise that degrades the noise figure of the receiver. Adaptive filter 430 may be designed to minimize noise contribution by using various circuit design techniques known in the art. This way, system requirements can be met even with the additional noise contribution from adaptive filter 430.

Adaptive filter 430 is a feedback system and is unstable if the total phase delay along the feedback loop is 180° and the loop gain is greater than one. For an ideal adaptive filter, the only delay along the feedback loop is 90° introduced by the integrators. For a practical adaptive filter, a delay is introduced by each circuit block within the adaptive filter.

Figure 7:
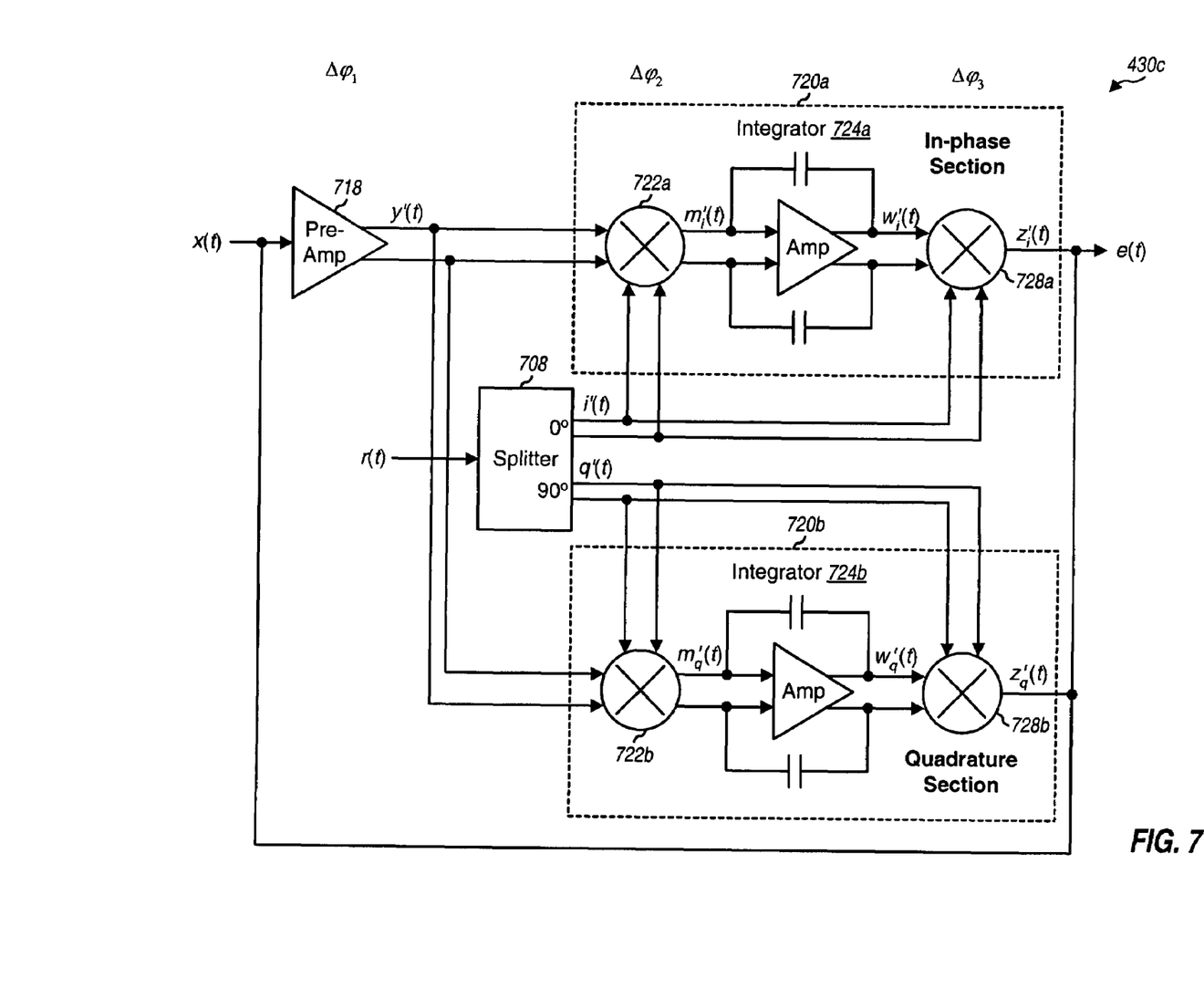
FIGS. 7 and 8 show two more detailed embodiments of the adaptive filter.

FIG. 7 shows a block diagram of an adaptive filter 430c, which is a more detailed embodiment of adaptive filter 430. A quadrature splitter 708 receives the reference signal, r(t), and provides a differential in-phase reference signal, i'(t), and a differential quadrature reference signal, q'(t).

A pre-amplifier 718 receives and amplifies the filter input signal, x(t), and provides a differential output signal, y'(t), to an in-phase section 720a and a quadrature section 720b. Within in-phase section 720a, a multiplier 722a receives and multiplies the y'(t) signal with the i'(t) signal and provides a differential $m_i'(t)$ signal. An integrator 724a receives and integrates the $m_i'(t)$ signal and provides a differential $w_i'(t)$ signal. Integrator 724a is implemented with an amplifier and two capacitors coupled between the differential output and the differential input of the amplifier, as shown in FIG. 7. A multiplier 728a receives and multiplies the $w_i'(t)$ signal with the i'(t) signal and provides a $z_i'(t)$ signal. Within quadrature section 720b, a multiplier 722b, an integrator 724b, and a multiplier 728b similarly process the y'(t) signal with the q'(t) signal and provide a $z_q'(t)$ signal. The $z_i'(t)$ and $z_q'(t)$ signals are current outputs and may be combined by tying these outputs together to obtain the estimator signal, e(t). The e(t) signal is subtracted from the x(t) signal by tying these signals together at the input of pre-amplifier 718. For the circuit embodiment shown in FIG. 7, the summer is just a node labeled by a black dot at the input of pre-amplifier 718, and the input of the adaptive filter is also its output (i.e., y(t)=x(t)).

Pre-amplifier 718 has a delay of $\Delta\phi_1$ at the frequency of the TX leakage signal. Multipliers 722a and 722b each has a delay of $\Delta\phi_2$ due to unequal delays of the RF and LO inputs. Multipliers 728a and 728b each has a delay of $\Delta\phi_3$ from the reference signal to the multiplier output at the frequency of the TX leakage signal. The total delay $\Delta\phi$ for adaptive filter 430c may be computed as: $\Delta\phi=\Delta\phi_1+\Delta\phi_2+\Delta\phi_3$.

Figure 9:
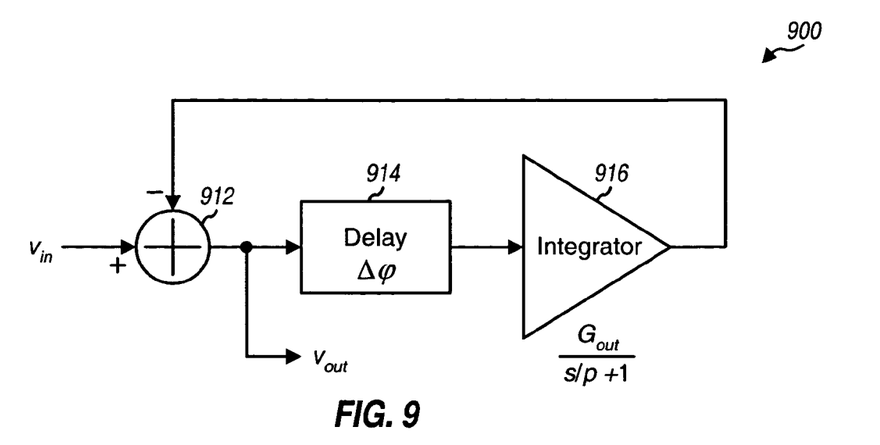
FIG. 9 shows a simplified model of the adaptive filter for stability analysis.

FIG. 9 shows a simplified model 900 for the adaptive filter which is suitable for stability analysis. A summer 912 receives and subtracts the output of an integrator 916 from the filter input signal, $V_{in}$, and provides the filter output signal, $V_{out}$. A delay element 914 delays the $V_{out}$ signal by a delay of $\Delta\phi$. Integrator 916 integrates the delayed signal with a transfer function of $G_o/(s/p+1)$. The transfer function between the filter output signal to the filter input signal may be expressed as:

$$\frac{v_{out}}{v_{in}} = \frac{s/p+1}{s/p+1+G_o \cdot e^{j\Delta\phi}}. \qquad \text{Eq (15)}$$

A step response for equation (15) may be expressed as:

$$V_{out}(t) \approx e^{-(1+G_o \cdot e^{j\Delta\phi})pt} = e^{-(1+G_o \cdot \cos(\Delta\phi))pt}. \quad \text{Eq (16)}$$

Equation (16) indicates that the filter output signal is an oscillatory signal having an exponential decay of $e^{-pt}$ due to the integrator pole at p. The presence of the delay $\Delta\phi$ introduces oscillations in the filter output signal. The amplitude of the oscillations can either decay or grow depending on the delay $\Delta\phi$. It can be shown that the adaptive filter is (1) stable if $\Delta\phi$ is in the range of −90° to +90° and (2) unstable if $|\Delta\phi|$ exceeds 90°. For example, if $\Delta\phi_1$=40°, $\Delta\phi_2$=0°, and $\Delta\phi_3$=60°, then $\Delta\phi$=100° and the adaptive filter oscillates.

Figure 8:
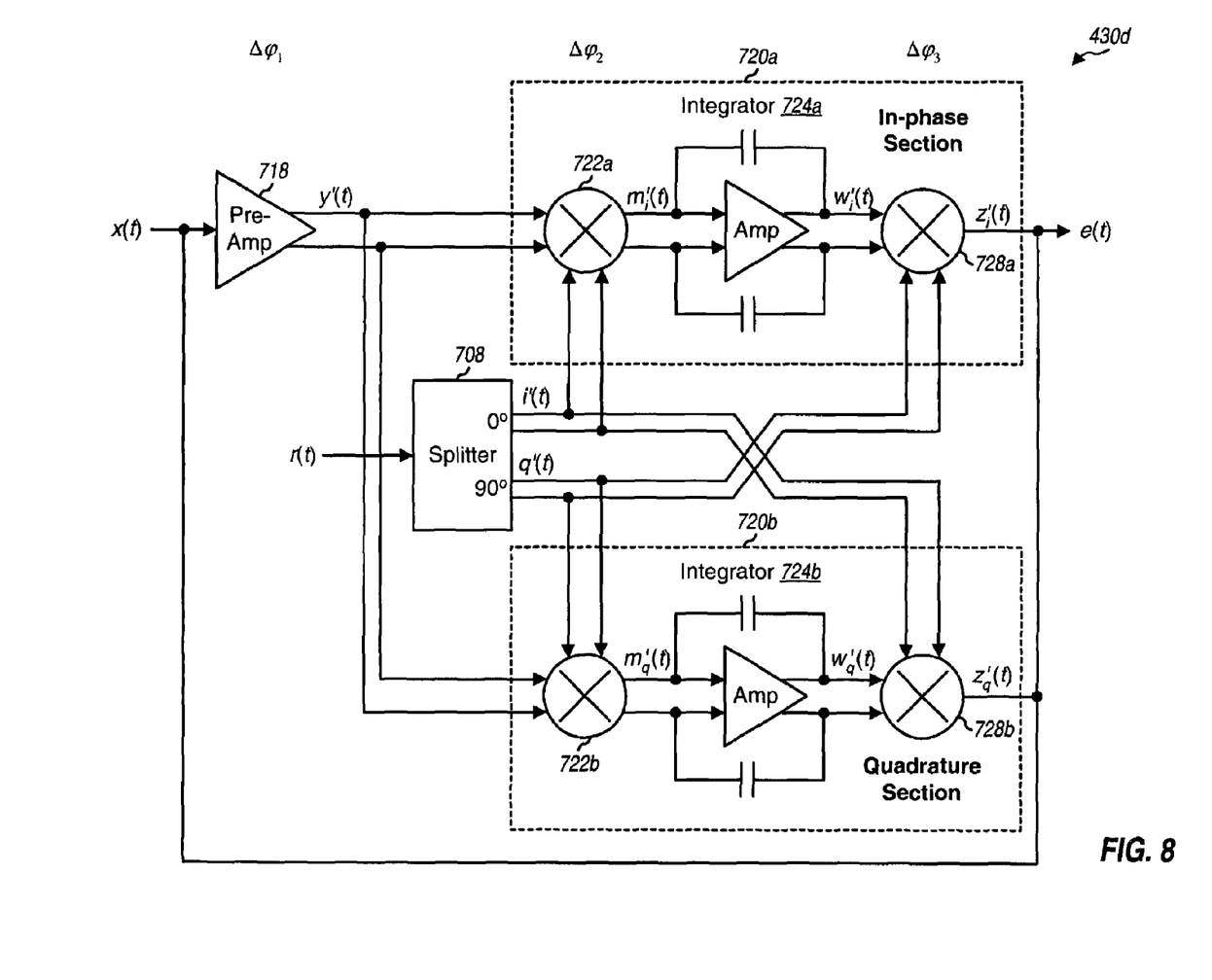

FIG. 8 shows a block diagram of an adaptive filter 430d, which is another more detailed embodiment of adaptive filter 430. Adaptive filter 430d utilizes an architecture that can compensate for phase delays (e.g., $\Delta\phi_1$ and $\Delta\phi_3$) at RF frequencies. Adaptive filter 430d includes all of the circuit blocks of adaptive filter 430c in FIG. 7. However, adaptive filter 430d uses different reference signals for the two multipliers in each of sections 720a and 720b. For in-phase section 720a, multiplier 722a is driven by the i'(t) signal and multiplier 728a is driven by the q'(t) signal (instead of the i'(t) signal). For quadrature section 720b, multiplier 722b is driven by the q'(t) signal and multiplier 728b is driven by the i'(t) signal (instead of the q'(t) signal). The LO signals for multipliers 728a and 728b thus lead the LO signals for multipliers 722a and 722b, respectively, by 90°. The total delay $\Delta\phi$ is also correspondingly reduced by 90°. For the example described above, the total delay is $\Delta\phi$=10° instead of 100°, and the adaptive filter is stable.

The adaptive filters shown in FIGS. 5 and 6 may be implemented in various manners. Two exemplary implementations are shown in FIGS. 7 and 8. The circuit blocks for the adaptive filters may also be implemented in various manners. For example, the multipliers may be implemented with mixers, summers may be implemented by tying current outputs together, and so on. The adaptive filters may also be implemented with differential or single-ended circuit designs. FIGS. 7 and 8 show exemplary differential designs for adaptive 430a in FIG. 5. A differential design may provide certain advantages over a single-ended design such as better immunity to noise.

The adaptive filters described herein utilize an LMS adaptive estimator to estimate the TX leakage signal. Other types of estimators may also be used to estimate the TX leakage signal, and this is within the scope of the invention. For example, the transmit signal may be stepped across the TX frequency band and weight values $w_i$ and $w_q$ may be determined for the in-phase and quadrature sections, respectively, and used in place of $w_i(t)$ and $w_q(t)$ in FIG. 5 to estimate the TX leakage signal.

The adaptive filters may also be trained in various manners. For example, an adaptive filter may be enabled at the beginning of a training burst (which contains a known training signal) and weight values may be derived based on this burst. The weight values may thereafter be fixed and used for estimating the TX leakage signal during the signaling interval. The weight values may be updated whenever the training bursts are available. To speed up convergence, the conditions for the integrators may be determined and stored prior to tuning away from an RF channel, and the integrators may be initialized with the stored conditions the next time this RF channel is selected.

The adaptive filters described herein may also be used for various systems and applications. For example, the adaptive filters may be used in wireless full-duplex communication systems such as cellular systems, OFDM systems, orthogonal frequency division multiple access (OFDMA) systems, multiple-input multiple-output (MIMO) systems, wireless local area networks (LANs), and so on. The full-duplex cellular systems include CDMA system and some versions of Global System for Mobile Communications (GSM) systems, and the CDMA systems include IS-95, IS-2000, IS-856, and Wideband-CDMA (W-CDMA) systems. The adaptive filters may be used for a wireless device as well as a base station in a wireless full-duplex communication system.

The adaptive filters described herein may be implemented within an integrated circuit (IC), an RF integrated circuit, an application specific integrated circuit (ASIC), or other electronic units designed to perform the functions described herein. The adaptive filters may also be fabricated with various IC process technologies such as complementary metal oxide semiconductor (CMOS), bipolar junction transistor (BJT), bipolar-CMOS (BiCMOS), silicon germanium (SiGe), gallium arsenide (GaAs), and so on.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An integrated circuit comprising:
    a summer operative to receive an input signal having a transmit leakage signal and to receive an estimator signal having an estimate of the transmit leakage signal, to subtract the estimator signal from the input signal, and to provide an output signal having the transmit leakage signal attenuated, wherein the transmit leakage signal corresponds to a portion of a modulated signal being transmitted in a wireless full-duplex communication system; and
    an estimator operative to receive the output signal and a reference signal having a version of the modulated signal, to estimate the transmit leakage signal in the input signal based on the output signal and the reference signal, and to provide the estimator signal having the estimate of the transmit leakage signal.

2. The integrated circuit of claim 1, further comprising:
    a low noise amplifier (LNA) operative to amplify a receiver input signal and provide the input signal.

3. The integrated circuit of claim 1, further comprising:
    a low noise amplifier (LNA) operative to amplify the output signal and provide an amplified signal for frequency downconversion to baseband.

4. The integrated circuit of claim 1, further comprising:
    a mixer operative to frequency downconvert the output signal with a local oscillator (LO) signal and provide a downconverted signal.

5. The integrated circuit of claim 1, wherein the estimator utilizes a least mean squared (LMS) algorithm to minimize a mean square error (MSE) between the transmit leakage signal in the input signal and the estimate of the transmit leakage signal in the estimator signal.

6. The integrated circuit of claim 1, wherein the estimator comprises
    a first multiplier operative to multiply the output signal with an in-phase reference signal and to provide a first in-phase signal, a first integrator operative to integrate the first in-phase signal and to provide a second in-phase signal, a second multiplier operative to multiply the second in-phase signal with the in-phase reference signal or a quadrature reference signal and to provide a third in-phase signal, wherein the in-phase and quadrature reference signals are generated from the reference signal, a third multiplier operative to multiply the output signal with the quadrature reference signal and to provide a first quadrature signal, a second integrator operative to integrate the first quadrature signal and to provide a second quadrature signal, and a fourth multiplier operative to multiply the second quadrature signal with the in-phase or quadrature reference signal and to provide a third quadrature signal, and wherein the estimator signal is obtained by summing the third in-phase signal and the third quadrature signal.

7. The integrated circuit of claim 6, further comprising:
a quadrature splitter operative to receive the reference signal and provide the in-phase reference signal and the quadrature reference signal.

8. The integrated circuit of claim 6, wherein the second multiplier is operative to multiply the second in-phase signal with the quadrature reference signal, and wherein the fourth multiplier is operative to multiply the second quadrature signal with the in-phase reference signal.

9. The integrated circuit of claim 6, wherein the second multiplier is operative to multiply the second in-phase signal with the inphase reference signal, and wherein the fourth multiplier is operative to multiply the second quadrature signal with the quadrature reference signal.

10. The integrated circuit of claim 6, wherein the first, second, third, and fourth multipliers are implemented with mixers, and wherein the in-phase and quadrature reference signals are used as local oscillator (LO) signals for the mixers.

11. The integrated circuit of claim 6, wherein the estimator further comprises
a first lowpass filter coupled between the first integrator and the second multiplier, and
a second lowpass filter coupled between the second integrator and the fourth multiplier.

12. The integrated circuit of claim 11, wherein the first and second lowpass filters are single-pole lowpass filters.

13. The integrated circuit of claim 6, further comprising:
switches operable to reset outputs of the first and second integrators prior to enabling the estimator.

14. The integrated circuit of claim 6, wherein the first through fourth multipliers and the first and second integrators are implemented with a differential circuit design.

15. The integrated circuit of claim 1, wherein the estimator is operable to derive a set of weight values based on a training burst, and to use the set of weight values to estimate the transmit leakage signal in the input signal.

16. The integrated circuit of claim 1, wherein the estimator provides at least 30 dB of rejection of the transmit leakage signal.

17. A wireless device in a wireless full-duplex communication system, comprising:
a low noise amplifier (LNA) operative to amplify a receiver input signal and to provide an input signal having a transmit leakage signal, wherein the transmit leakage signal corresponds to a portion of a modulated signal being transmitted;
an adaptive filter operative to receive the input signal and a reference signal having a version of the modulated signal, to generate an estimator signal having an estimate of the transmit leakage signal based on an output signal and the reference signal, and to subtract the estimator signal from the input signal to obtain the output signal having the transmit leakage signal attenuated; and
a mixer operative to receive and frequency downconvert the output signal with a local oscillator (LO) signal and to provide a downconverted signal.

18. The wireless device of claim 17, wherein the wireless full-duplex communication system is a Code Division Multiple Access (CDMA) system.

19. The wireless device of claim 17, wherein the adaptive filter utilizes a least mean squared (LMS) algorithm to minimize a mean square error (MSE) between the transmit leakage signal in the input signal and the estimate of the transmit leakage signal in the estimator signal.

20. The wireless device of claim 17, wherein the adaptive filter comprises
a first multiplier operative to multiply the output signal with an in-phase reference signal and to provide a first in-phase signal,
a first integrator operative to integrate the first in-phase signal and to provide a second in-phase signal,
a second multiplier operative to multiply the second in-phase signal with the in-phase reference signal or a quadrature reference signal and to provide a third in-phase signal, wherein the in-phase and quadrature reference signals are generated from the reference signal,
a third multiplier operative to multiply the output signal with the quadrature reference signal and to provide a first quadrature signal,
a second integrator operative to integrate the first quadrature signal and to provide a second quadrature signal,
a fourth multiplier operative to multiply the second quadrature signal with the in-phase or quadrature reference signal and to provide a third quadrature signal, and wherein the estimator signal is obtained by summing the third in-phase signal and the third quadrature signal, and
a summer operative to subtract the estimator signal from the input signal and to provide the output signal.

21. An apparatus in a wireless full-duplex communication system, comprising:
means for subtracting an estimator signal from an input signal and providing an output signal, the input signal having a transmit leakage signal, the estimator signal having an estimate of the transmit leakage signal, and the output signal having the transmit leakage signal attenuated, wherein the transmit leakage signal corresponds to a portion of a modulated signal being transmitted; and
means for estimating the transmit leakage signal in the input signal based on the output signal and a reference signal and providing the estimator signal, the reference signal having a version of the modulated signal.

22. The apparatus of claim 21, wherein transmit leakage signal in the input signal is estimated based on a least mean squared (LMS) algorithm to minimize a mean square error (MSE) between the transmit leakage signal in the input signal and the estimate of the transmit leakage signal.

23. The apparatus of claim 21, wherein the means for estimating the transmit leakage signal in the input signal comprises
means for multiplying the output signal with an in-phase reference signal to obtain a first in-phase signal,
means for integrating the first in-phase signal to obtain a second in-phase signal, means for multiplying the second in-phase signal with the in-phase reference signal or a quadrature reference signal to obtain a third in-phase signal, wherein the in-phase and quadrature reference signals are generated from the reference signal, means for multiplying the output signal with the quadrature reference signal to obtain a first quadrature signal, means for integrating the first quadrature signal to obtain a second quadrature signal, means for multiplying the second quadrature signal with the in-phase or quadrature reference signal to obtain a third quadrature signal, and means for summing the third in-phase signal and the third quadrature signal to obtain the estimator signal.

24. The apparatus of claim 23, wherein the means for estimating the transmit leakage signal in the input signal farther comprises means for filtering the second in-phase signal to obtain a filtered second in-phase signal, and wherein the filtered second in-phase signal is multiplied with the in-phase or quadrature reference signal to obtain the third in-phase signal, and means for filtering the second quadrature signal to obtain a filtered second quadrature signal, and wherein the filtered second quadrature signal is multiplied with the in-phase or quadrature reference signal to obtain the third quadrature signal.

25. The apparatus of claim 23, further comprising:
means for resetting the second in-phase signal and the second quadrature signal to known values.

26. A method of suppressing transmit leakage signal in a wireless full-duplex communication system, comprising:

subtracting an estimator signal from an input signal to obtain an output signal, the input signal having a transmit leakage signal, the estimator signal having an estimate of the transmit leakage signal, and the output signal having the transmit leakage signal attenuated, wherein the transmit leakage signal is a portion of a modulated signal being transmitted; and estimating the transmit leakage signal in the input signal based on the output signal and a reference signal having a version of the modulated signal and providing the estimator signal having the estimate of the transmit leakage signal.

27. The method of claim 26, wherein transmit leakage signal in the input signal is estimated based on a least mean squared (LMS) algorithm to minimize a mean square error (MSE) between the transmit leakage signal in the input signal and the estimate of the transmit leakage signal.

28. The method of claim 26, wherein the estimating the transmit leakage signal comprises multiplying the output signal with an in-phase reference signal to obtain a first in-phase signal, integrating the first in-phase signal to obtain a second in-phase signal, multiplying the second in-phase signal with the in-phase reference signal or a quadrature reference signal to obtain a third in-phase signal, wherein the in-phase and quadrature reference signals are generated from the reference signal, multiplying the output signal with the quadrature reference signal to obtain a first quadrature signal, integrating the first quadrature signal to obtain a second quadrature signal, multiplying the second quadrature signal with the in-phase or quadrature reference signal to obtain a third quadrature signal, and summing the third in-phase signal and the third quadrature signal to obtain the estimator signal.

* * * * *